(12) United States Patent
Kobayashi

(10) Patent No.: US 7,362,684 B2
(45) Date of Patent: Apr. 22, 2008

(54) RECORDING/REPRODUCING DEVICE

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 541 days.

(21) Appl. No.: 10/258,992

(22) PCT Filed: Feb. 25, 2002

(86) PCT No.: PCT/JP02/01686

§ 371 (c)(1),
(2), (4) Date: May 12, 2003

(87) PCT Pub. No.: WO02/071398

PCT Pub. Date: Sep. 12, 2002

(65) Prior Publication Data

US 2003/0174624 A1 Sep. 18, 2003

(30) Foreign Application Priority Data

Mar. 2, 2001 (JP) .............................. 2001-58845

(51) Int. Cl.
*G11B 5/09* (2006.01)

(52) U.S. Cl. .............................. 369/59.25; 369/44.26; 369/53.37; 369/257.3

(58) Field of Classification Search ..................... None
See application file for complete search history.

(56) References Cited

U.S. PATENT DOCUMENTS 6,452,897 B1 * 9/2002 Van Den Enden ....... 369/275.1
6,791,920 B1 * 9/2004 Ko et al. ................. 369/47.27
6,795,389 B1 * 9/2004 Nishiuchi et al. ........ 369/275.3
2002/0051414 A1 * 5/2002 Kuribayashi ............. 369/53.24

FOREIGN PATENT DOCUMENTS

| GB | 2330938 | 5/1999 |
|---|---|---|
| JP | 5-159376 | 5/1993 |
| JP | 11-134655 | 5/1999 |
| JP | 11-175979 | 7/1999 |
| JP | 2000-276776 | 10/2000 |
| JP | 2001-52342 | 2/2001 |

* cited by examiner

*Primary Examiner*—Wayne Young
*Assistant Examiner*—Lixi Chow
(74) *Attorney, Agent, or Firm*—Oblon, Spivak, McClelland, Maier & Neustadt, P.C.

(57) ABSTRACT

The present invention relates to a recording-reproduction apparatus and a program adapted for use in recording data on and/or reproducing the same from an optical disk having two recording layers on one side thereof. In such a dual-layer optical disk, one recording film L0 layer is unformatted, while another recording film L1 layer is formatted. The recording film L0 layer is formatted by marks at step S1, and marks corresponding to data to be recorded are formed first in the recording film L0 layer at step S2. When the recording film L0 layer has been completely used, marks corresponding to data to be recorded are formed in the recording film L1 layer at step S3. The invention is applicable to a DVD player for example.

19 Claims, 17 Drawing Sheets

FIG. 3

| SM 60ch | VF01 414ch | PrA1 30ch | AM1 21ch | ID1 102ch | PoA1 6ch | VFO2 288ch | PrA12 30ch | AM2 21ch | ID2 102ch | PoA2 6ch |

← 1080ch →

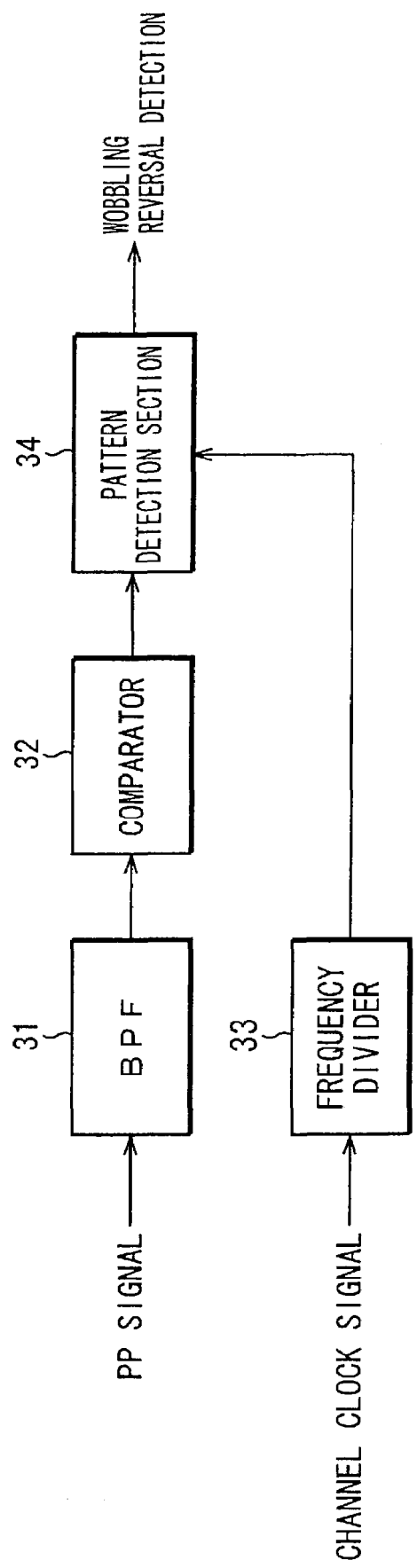
F I G. 8

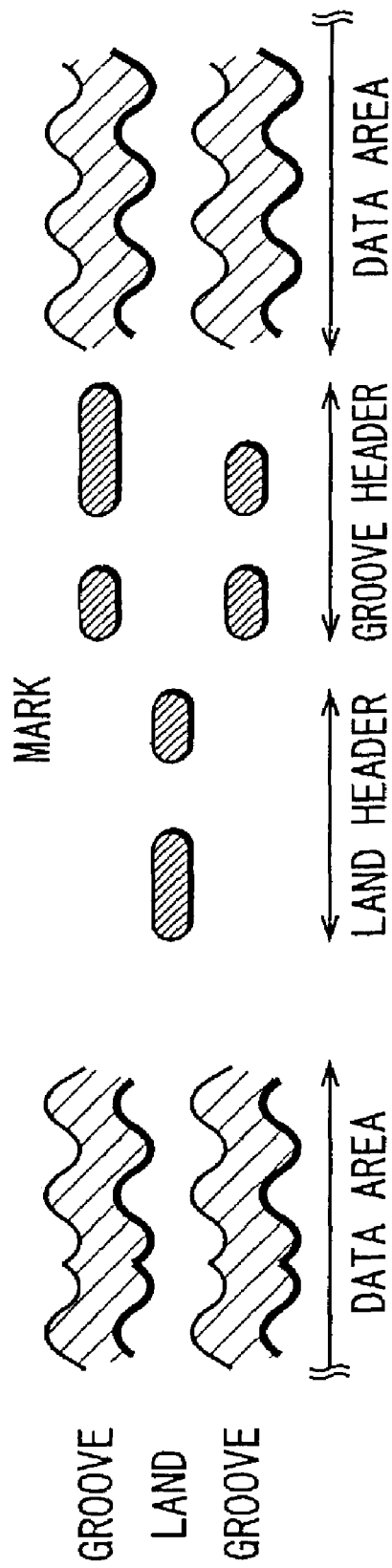

RECORDING/REPRODUCING DEVICE

TECHNICAL FIELD

The present invention relates to a recording and/or reproduction apparatus and, more particularly, to an apparatus adapted for recording data on and/or reproducing the same from an optical disk having two recording layers on one side thereof.

BACKGROUND ART

Development of dual-layer recording-reproduction optical disks is now in progress, wherein a dual-layer recording film is formed on one side of the optical disk so as to double the recording capacity per side.

As shown in a sectional view of FIG. 1, a dual-layer recording-reproduction optical disk has, on its substrate of polycarbonate or the like, a recording film L1 layer for recording data, a space layer, a recording film L0 layer for recording data, and a cover layer for protecting the recording film L0 layer and so forth formed thereunder. An optical pickup (not shown) for irradiating a laser beam to the dual-layer recording-reproduction optical disk and receiving the reflected beam therefrom is positioned above in the drawing. Hereinafter each of the recording film L0 layer and the recording film L1 layer will be referred to simply as a recording layer in case there is no necessity of distinguishing these two layers from each other.

For the purpose of recording data in the recording layer of such a dual-layer recording-reproduction optical disk, it is necessary to format the recording layer by first dividing the same into sectors each composed of 2048 (=2K) bytes as a unit for recording and reproduction, and then recording a sector address in a header of each sector.

As to techniques for recording sector addresses and data in the recording layer, there are known a method of forming pits (small holes) by embossing or the like in manufacture of a dual-layer recording-reproduction optical disk, and another method of recording marks (phase transition areas) by irradiating a laser beam to the recording layer of a completed dual-layer recording-reproduction optical disk. Hereinafter a pit formed in the process of manufacturing a dual-layer recording-reproduction optical disk will be referred to as an "embossed pit".

When recording any mark in and/or reading the same from the recording film L1 layer of the dual-layer recording-reproduction optical disk, as shown in FIG. 1, a laser beam emitted from an unshown optical pickup is irradiated to the recording film L1 layer via the recording film L0 layer, and a reflected beam from the recording film L1 layer is received by the optical pickup via the recording film L0 layer.

With regard to the laser beam transmittance and reflectance, any portion of the recording film layer having embossed pits or marks is different from the other portion thereof having none of such pits or marks.

Consequently, in irradiating the laser beam to the recording film L1 layer via the recording film L0 layer or in receiving the reflected beam from the recording film L1 layer via the recording film L0 layer, there occurs some change or offset in the amplitude of the irradiated or reflected beam in accordance with the presence or absence of such embossed pits or marks on the recording film L0 layer, hence raising a problem that high-precision recording or reproduction of marks in or from the recording film L1 layer is difficult.

DISCLOSURE OF INVENTION

The present invention has been accomplished in view of the circumstances mentioned above. And an object of the invention is to realize high-precision recording and/or reproduction of marks on and/or from a recording film L0 layer and a recording film L1 layer of a dual-layer recording-reproduction optical disk.

The recording-reproduction apparatus of the present invention includes a recording means for recording a mark on a first or second recording layer by irradiating a laser beam to an optical disk; a beam receiving means for receiving the laser beam irradiated to the optical disk and reflected therefrom; a data signal generation means for generating a data signal in accordance with the reflected beam received by the beam receiving means; a control signal generation means for generating a control signal in accordance with the reflected beam received by the beam receiving means; a detection means for detecting a header area in the first recording layer; and a format means for formatting the first recording layer by controlling the recording means to record the mark corresponding to a header in the header area detected by the detection means.

The second recording layer of the optical disk may be one formatted by embossed pits.

Tracks on the first and second recording layers of the optical disk may be formed of wobbles, and the phase of the wobble may be reversed immediately before the header area.

The recording-reproduction apparatus of the present invention may further include a wobble signal generation means for generating, in response to the reflected beam signal, a wobble signal corresponding to the wobble formed in the track; and an adjust means for adjusting a synchronizing signal on the basis of the wobble signal.

The detection means may be capable of detecting a header area in accordance with inversion of the phase of the wobble signal.

The detection means may be capable of detecting a mirror mark, which corresponds to the header area, in accordance with the data signal.

The recording-reproduction method of the present invention comprises a recording step of recording a mark on a first or second recording layer by irradiating a laser beam to an optical disk; a beam receiving step of receiving the laser beam irradiated to the optical disk and reflected therefrom; a data signal generation step of generating a data signal in accordance with the reflected beam received by the process at the beam receiving step; a control signal generation step of generating a control signal in accordance with the reflected beam received by the process at the beam receiving step; a detection step of detecting a header area in the first recording layer; and a format step of formatting the first recording layer by controlling the process at the recording step to record the mark corresponding to a header in the header area detected by the process at the detection step.

A program contained in the recording medium of the present invention includes a recording step of recording a mark on a first or second recording layer by irradiating a laser beam to an optical disk; a beam receiving step of receiving the laser beam irradiated to the optical disk and reflected therefrom; a data signal generation step of generating a data signal in accordance with the reflected beam received by the process at the beam receiving step; a control signal generation step of generating a control signal in accordance with the reflected beam received by the process at the beam receiving step; a detection step of detecting a header area in the first recording layer; and a format step of formatting the first recording layer by controlling the process at the recording step to record the mark corresponding to a header in the header area detected by the process at the detection step.

The program of the present invention enables a computer to execute a recording step of recording a mark on a first or second recording layer by irradiating a laser beam to an optical disk; a beam receiving step of receiving the laser beam irradiated to the optical disk and reflected therefrom; a data signal generation step of generating a data signal in accordance with the reflected beam received by the process at the beam receiving step; a control signal generation step of generating a control signal in accordance with the reflected beam received by the process at the beam receiving step; a detection step of detecting a header area in the first recording layer; and a format step of formatting the first recording layer by controlling the process at the recording step to record corresponding header in the header area detected by the process at the detection step.

In the recording-reproduction apparatus and method of the present invention and the program thereof, a mark is recorded in the first or second recording layer by irradiation of a laser beam to the optical disk. The laser beam irradiated to the optical disk is reflected therefrom and then is received. A data signal is generated on the basis of the reflected beam thus received, and a control signal is generated in accordance with the received reflected beam. Further, a header area in the first recording layer is detected and, while the recording process is controlled, a mark corresponding to a header is recorded in the detected header area, whereby the first recording layer is formatted.

BRIEF DESCRIPTION OF DRAWINGS

FIG. 3 is a diagram showing the data structure of a header;

FIG. 8 is a block diagram showing a first structural example of a header area detector 14;

FIG. 16 is a diagram showing a recording film L0 layer of a formatted optical disk 1;

BEST MODE FOR CARRYING OUT THE INVENTION

Hereinafter a detailed description will be given on an optical disk drive representing an embodiment of the present invention. First, a dual-layer recording-reproduction optical disk 1 (FIG. 6) to be loaded in such an optical disk drive for recording data will be explained with reference to FIGS. 2 to 5.

Figure 1:
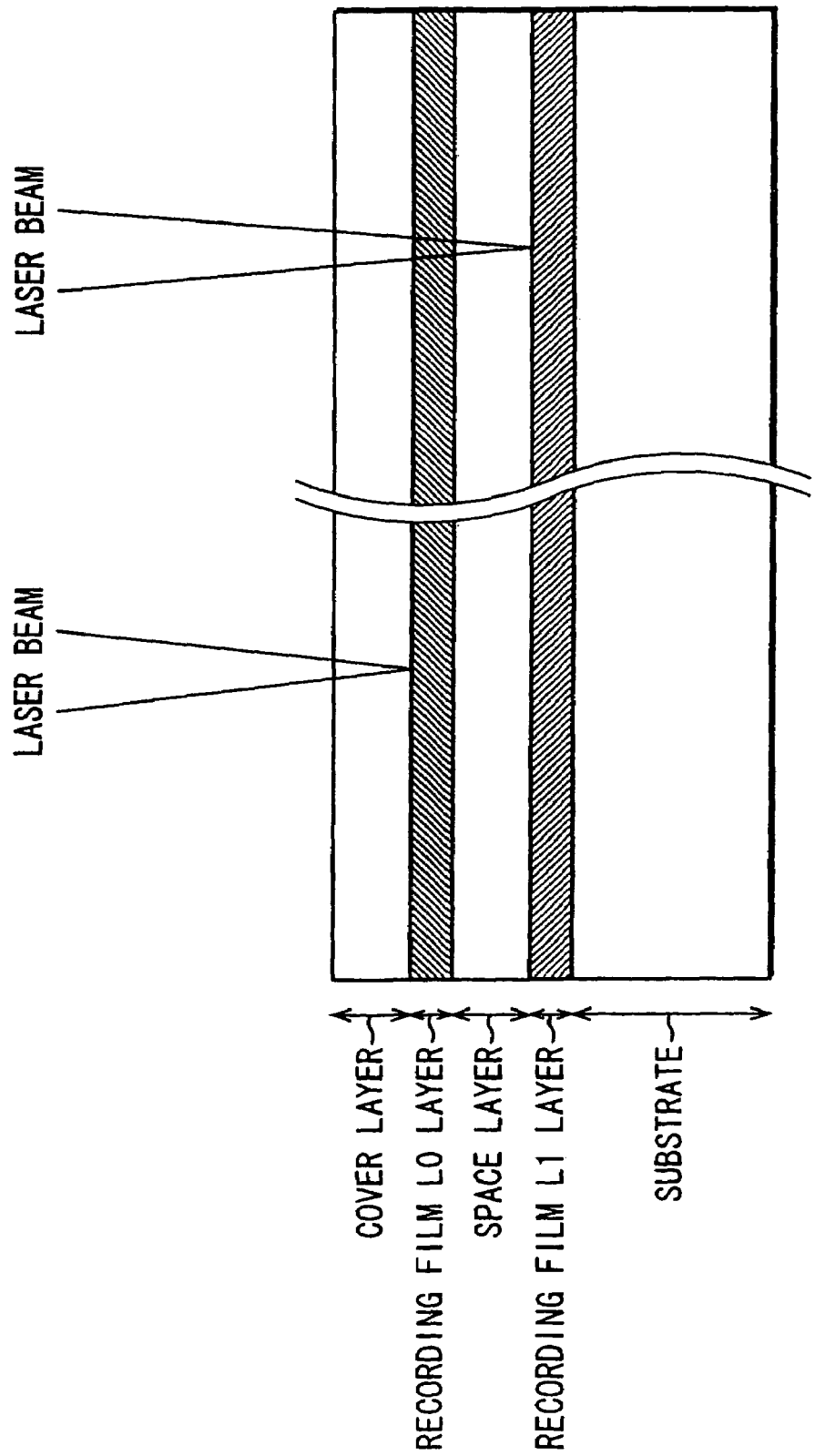
FIG. 1 is a sectional view of a dual-layer recording-reproduction optical disk.

As shown in FIG. 1, the dual-layer recording-reproduction optical disk 1 (hereinafter referred to simply as optical disk) has, on its substrate, a recording film L1 layer, a space layer, a recording film L0 layer and a cover layer formed in this order like a lamination.

Figure 2:
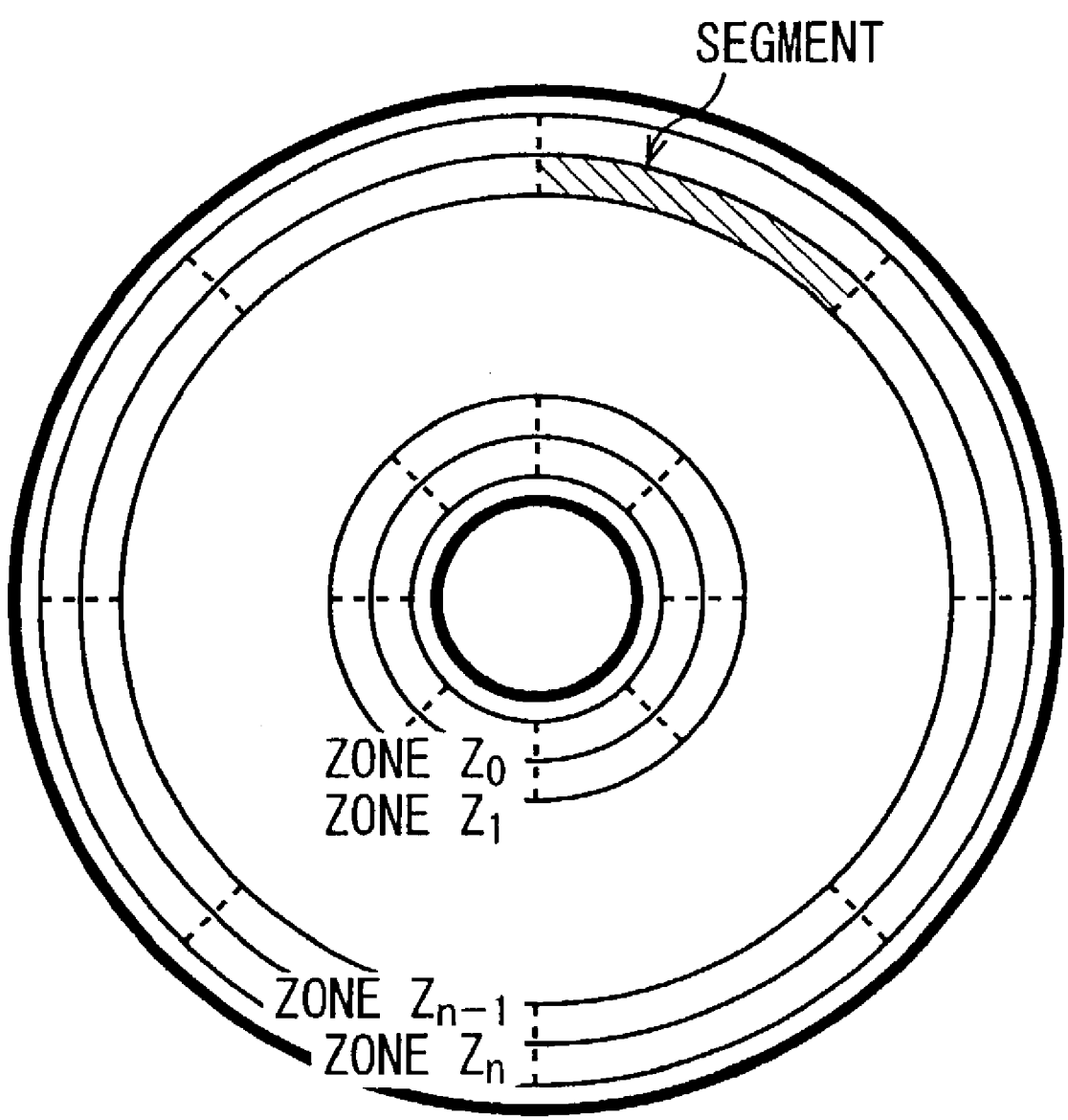
FIG. 2 is a diagram for explaining the structure of a dual-layer recording-reproduction optical disk 1.

FIG. 2 shows the recording layers (recording film L0 layer and recording film L1 layer) of the optical disk 1. On each recording layer of the optical disk, there are formed spiral guide grooves wobbled at a predetermined frequency. On the optical disk 1, a track composed of groove and a track composed of land are formed alternately per round. The wobble is detected in accordance with a pp (push-pull) signal and is used for generating a synchronizing signal.

The track per round of the optical disk 1 consists of eight segments. And each segment consists of a header area for recording a header, and a data area for recording data.

The optical disk 1 is divided into (n+1) zones $Z_0$-$Z_n$ each consisting of a plurality of radially adjacent tracks. The number (period) of wobbles formed in each of the tracks belonging to the same zone is common. More specifically, wobbles of (420+6i) periods are formed in each segment of the ith zone $Z_i$ (where i=0, 1, . . . , n) counted from the inside. Consequently, wobbles of 8 (420+6i) periods are formed in each track belonging to the zone $Z_i$.

For example, wobbles of 420 periods are formed in each segment of the innermost (i=0) zone $Z_0$. Therefore, wobbles of 3360 (=420×8) periods are formed in each track belonging to the zone $Z_0$. In another example, wobbles of 432 (420+6×2) periods are formed in each segment of the third (i=2) zone $Z_2$. Therefore, wobbles of 3456 (=8(420+6×2)) periods are formed in each track belonging to the zone $Z_2$.

The wavelength of wobbles formed in the innermost track of each zone is common. Addresses recorded in header areas are formed radially in each zone at a constant angular velocity (CAV). And the innermost density in each zone is common.

FIG. 3 shows the structure of 1080-channel data recorded by embossed pits or marks in the header area of each segment.

A segment mark SM1 of 60 channels is a unique pattern signifying a header. A VFO1 of 414 channels denotes a continuous data pattern for pulling a PLL (phase locked loop) into synchronism. A pre-angle PrA1 of 30 channels denotes a pattern for automatic gain control and offset control. An address mark AM1 of 21 channels denotes a pattern signifying the top of an address ID1. The address ID1 of 102 channels denotes a track address, a segment address and a CRC (cyclic redundancy check) code. A post-angle PoA1 of 6 channels denotes a pattern for the address ID1 to satisfy the channel coding rule.

A VFO2 of 288 channels denotes a continuous data pattern for pulling the PLL into synchronism. A pre-angle PrA2 of 30 channels denotes a pattern for automatic gain control and offset control. An address mark AM2 of 21 channels denotes a pattern signifying the top of an address ID2. The address ID2 of 102 channels denotes a track address, a segment address and a CRC code. A post-angle PoA2 of 6 channels denotes a pattern for the address ID2 to satisfy the channel coding rule.

The address ID1 and the address ID2 are provided in the header area. Consequently, the address is recorded doubly in the header area.

Figure 4:
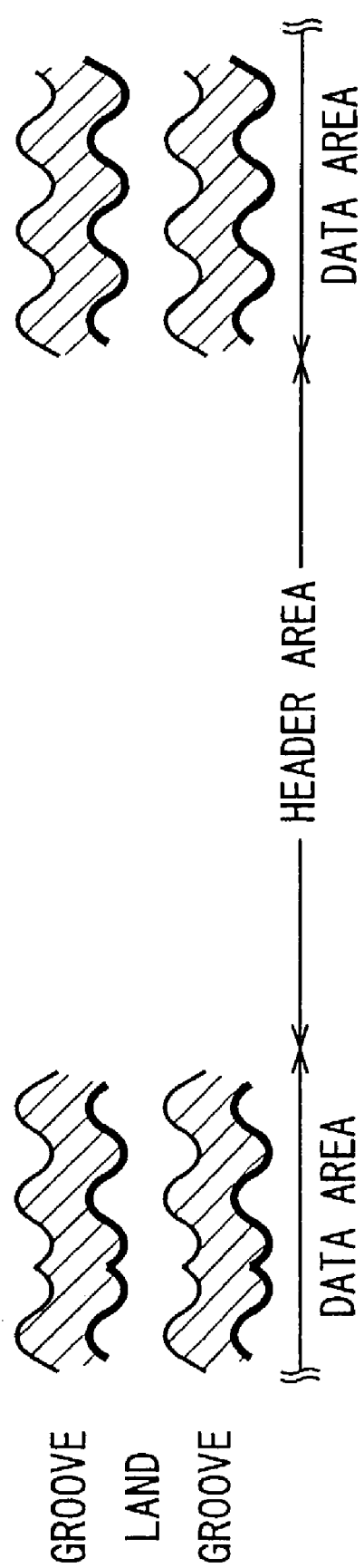
FIG. 4 is a diagram showing a recording film L0 layer of an unformatted optical disk 1.

FIG. 4 shows a header area and peripheral data areas in the recording film L0 layer of the optical disk 1 not formatted by the optical disk drive where the present invention is applied. As shown in this diagram, the wobble immediately before the header area is formed with its phase of periodic waveform reversed anterior to the header area by two periods. In the header area, a header address using embossed pits or marks has not yet been recorded. Hereinafter a header area without any recorded embossed pit or mark will be referred to as a mirror mark.

Figure 5:
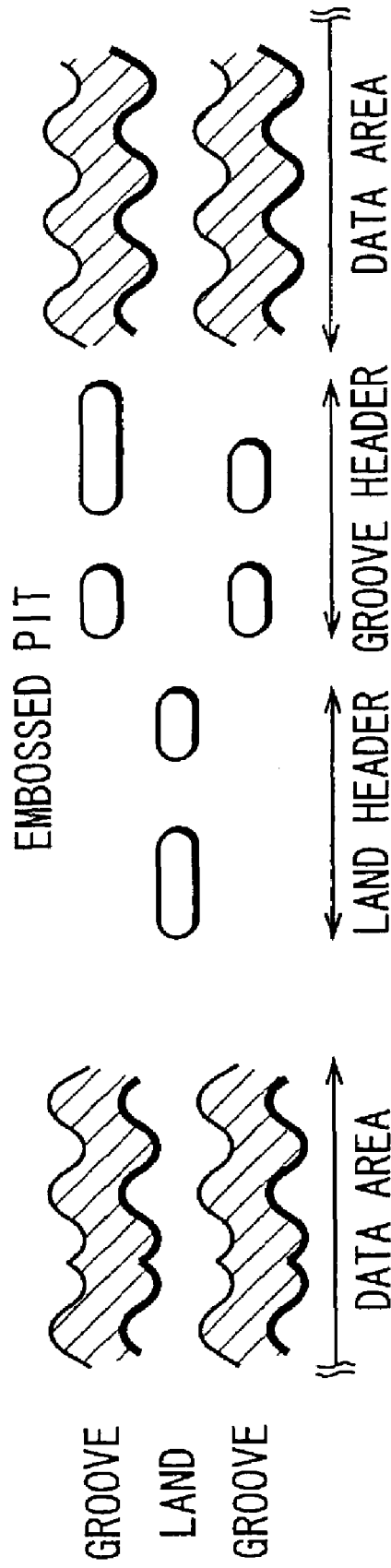
FIG. 5 is a diagram showing a recording film L1 layer of the unformatted optical disk 1.

FIG. 5 shows a header area and peripheral data areas in the recording film L1 layer of the optical disk 1 not formatted by the optical disk drive where the present invention is applied. As shown in this diagram, the wobble immediately before the header area is formed with its phase reversed anterior to the header area by two periods. And a land header is formed of embossed pits in the land of the header area. Further, a groove header is formed of embossed pits in the groove of the header area in such a manner as not to be adjacent to the land header in the radial direction.

As obvious from a comparison of FIGS. 4 and 5, nothing is recorded in the header area of the recording film L0 layer which constitutes the optical disk 1 prior to being formatted by the invention-applied optical disk drive. However, in the recording film L1 layer, a land header and a groove header are formed of embossed pits in the header area. That is, the recording film L0 layer constituting the optical disk 1 is not formatted yet, while the recording film L1 layer is already formatted in the process of manufacture.

Figure 6:
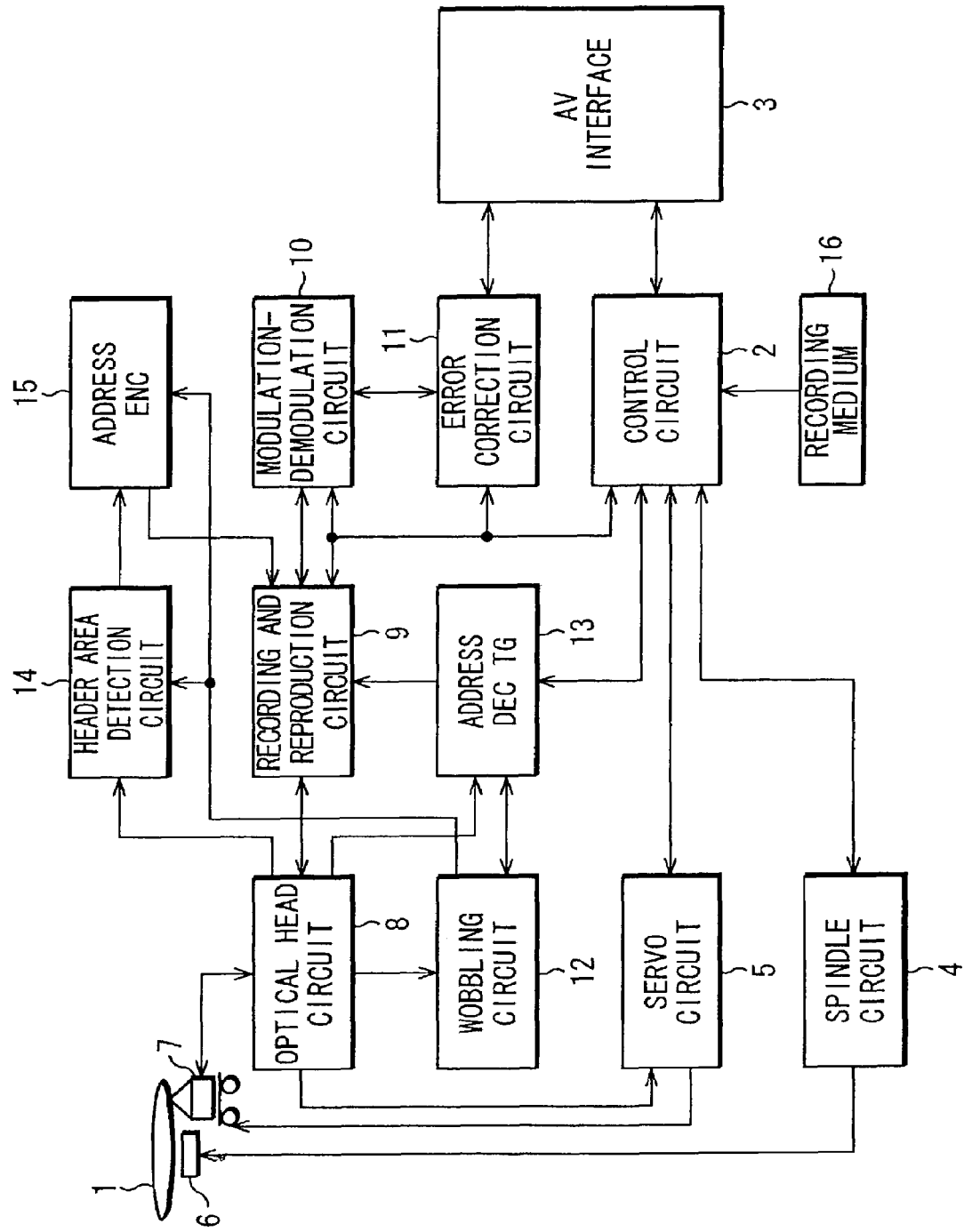
FIG. 6 is a block diagram showing a structural example of an optical disk drive which represents an embodiment of the present invention.

Referring now to FIG. 6, an explanation will be given on a structural example of an optical disk drive which records data on and/or reproduces the same from the optical disk 1 mentioned above.

In this optical disk drive, a control circuit 2 controls each component block of the optical disk drive in accordance with a control program stored in a recording medium 16. More specifically, the control circuit 2 controls each block of the optical disk drive in response to a recording command inputted from an external AV apparatus or the like (not shown) via an AV interface 3, and then records, on the optical disk 1, a mark corresponding to the record data inputted from the AV apparatus or the like. Further the control circuit 2 controls each block of the optical disk drive in response to a reproduction command inputted from the external AV apparatus or the like via the AV interface 3, and then reads out the recorded mark from the optical disk 1 to thereby reproduce the recorded data, and outputs the reproduced data to the external AV apparatus or the like via the AV interface 3.

A spindle circuit 4 controls the rotation of a spindle motor 6 in response to a command from the control circuit 2. A servo circuit 5 enables an optical pickup 7 to seek the address instructed from the control circuit 2, and controls a focus servo or a tracking servo for the optical pickup 7 in response to a focus error signal or a tracking error signal inputted from an optical head circuit 8. The spindle motor 6 is driven to rotate the optical disk 1 under control of the spindle circuit 4.

The optical pickup 7, which comprises a laser output unit, a reflected beam receiver, a dual-axis actuator and so forth, forms a mark in a recording mode by irradiating a laser beam to the recording layer of the optical disk 1 under control of the optical head circuit 8. Meanwhile in a recording-reproduction mode, the optical pickup 7 generates a reflected beam signal by irradiating a laser beam to the recording layer of the optical disk 1 and receiving the reflected beam therefrom, and then outputs the reflected beam signal to the optical head circuit 8.

In the recording mode, the optical head circuit 8 controls the laser output of the optical pickup 7 correspondingly to a header signal inputted from a recording-reproduction circuit 9 or to a recording-compensated binary signal. And in the reproducing mode, the optical head circuit 8 generates, in accordance with a reflected beam signal obtained from the optical pickup 7, an RF signal corresponding to the embossed pit or mark recorded on the optical disk 1, and then outputs the RF signal to the recording-reproduction circuit 9. Meanwhile in the recording-reproduction mode, the optical head circuit 8 generates a focus error signal and a tracking error signal in accordance with the reflected beam signal obtained from the optical pickup 7, and outputs such error signals to the servo circuit 5. Further the optical head circuit 8 generates a pp signal and then outputs the same to a wobbling circuit 12 and a header area detection circuit 14.

In a formatting mode, the recording-reproduction circuit 9 supplies, under control of the control circuit 2, a header signal inputted from an address encoder (ENC) 15 to the optical head circuit 8. Meanwhile in the recording mode, the recording-reproduction circuit 9 executes recording compensation for the binary signal obtained from a modulation-demodulation circuit 10, and then supplies the binary signal to the optical head circuit 8. Further in the reproducing mode, the recording-reproduction circuit 9 converts the RF signal from the optical head circuit 8 into binary data and then supplies the same to the modulation-demodulation circuit 10.

In the recording mode, the modulation-demodulation circuit 10 modulates, under control of the control circuit 2, the recording data with an error correction code inputted from an error correction circuit 11, and then outputs the modulated binary signal to the recording-reproduction circuit 9. Further in the reproducing mode, the modulation-demodulation circuit 10 demodulates the binary signal obtained from the recording-reproduction circuit 9, and then outputs the reproduced data to the error correction circuit 11.

Subsequently in the recording mode, the error correction circuit 11 attaches, under control of the control circuit 2, an ECC (error correction code) to the recording data supplied from an external AV apparatus or the like via the AV interface 3, and then outputs the data to the modulation-demodulation circuit 10. Further in the reproducing mode, the error correction circuit 11 corrects, on the basis of the ECC, any error in the reproduced data inputted from the modulation-demodulation circuit 10, and then outputs the corrected data to the external AV apparatus or the like via the AV interface 3.

In response to the pp signal inputted from the optical head circuit 8, the wobbling circuit 12 generates a channel clock signal by an internal PLL, and then outputs the clock signal to an address decoder-timing generator (DEC-TG) 13, a header area detection circuit 14 and an address encoder 15.

In the reproducing mode, the address decoder-timing generator 13 detects the address by decoding the RF signal from the optical head circuit 8, then outputs the address information to the control circuit 2, and supplies a wobble enable signal obtained therefrom to the wobbling circuit 12. Further, the address decoder-timing generator 13 generates a timing signal on the basis of the channel clock signal inputted from the wobbling circuit 12, and then supplies the timing signal to each component block of the optical disk drive via the control circuit 2.

The header area detection circuit 14 detects the header area of the recording layer in accordance with the pp signal inputted from the optical head circuit 8 and also in accordance with the channel clock signal inputted from the wobbling circuit 12, and outputs the header area information to the address encoder 15.

In the formatting mode, the address encoder 15 generates and encodes an address which is to be recorded in the header area detected by the head area detection circuit 14, and then outputs a header signal thus obtained to the recording-reproduction circuit 9.

Figure 7:
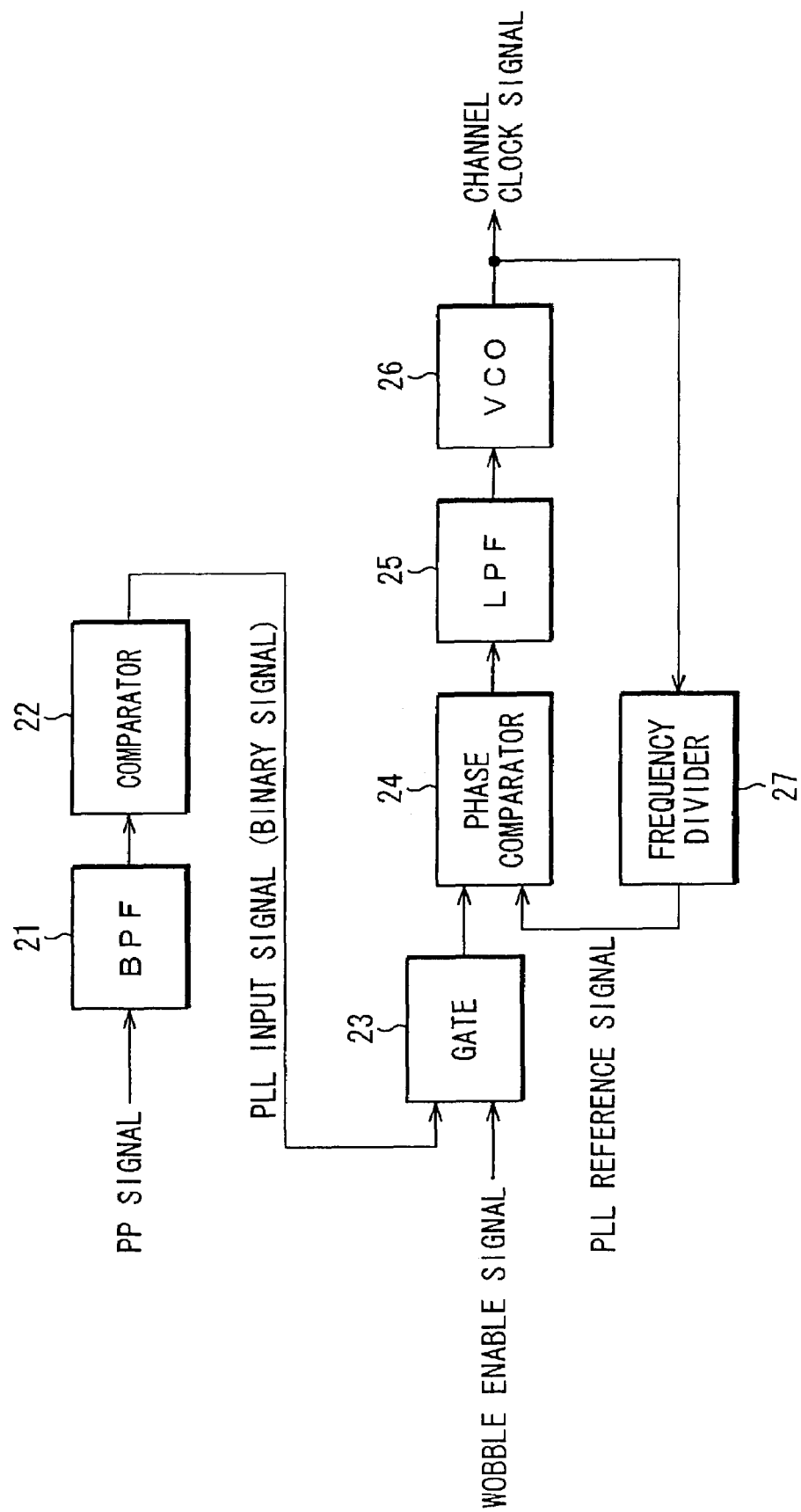
FIG. 7 is a block diagram showing a structural example of a wobbling circuit 12.

FIG. 7 shows a structural example of the PLL for generating a clock signal in the wobbling circuit 12.

A band-pass filter (BPF) 21 extracts only the wobble frequency component of the pp signal inputted from the optical head circuit 8, and then outputs a wobble signal obtained to a comparator 22. A high-pass filter may be used instead of the band-pass filter 21. The comparator 22 compares the wobble signal with a predetermined threshold value to thereby convert the wobble signal into a binary signal, and then supplies the converted signal as a PLL input signal to a gate 23. Subsequently, the gate 23 supplies the PLL input from the comparator 22 to a phase comparator 24 in response to the wobble enable signal obtained from the address decoder-timing generator 13. The phase comparator 24 generates a phase difference signal representing the phase difference between the PLL input signal from the gate 23 and a PLL reference signal inputted from a frequency divider 27, and then outputs the phase difference signal to a low-pass filter (LPF) 25. Thereafter the low-pass filter 25 eliminates the high-frequency component of the phase difference signal and then sends its output to a VCO (voltage-controlled oscillator) 26. The VCO 26 oscillates to generate a clock signal while adjusting the frequency and phase of the phase difference signal so that the voltage thereof becomes zero. The frequency divider 27 divides the frequency of the clock signal obtained from the VCO 26, and outputs the PLL reference signal thus obtained to the phase comparator 24.

FIG. 8 shows a first structural example of the header area detection circuit 14. The first structural example is capable of detecting the header area on the basis that the phase of periodic waveform of the wobble formed in a track is reversed two periods before the header area.

Figure 9:
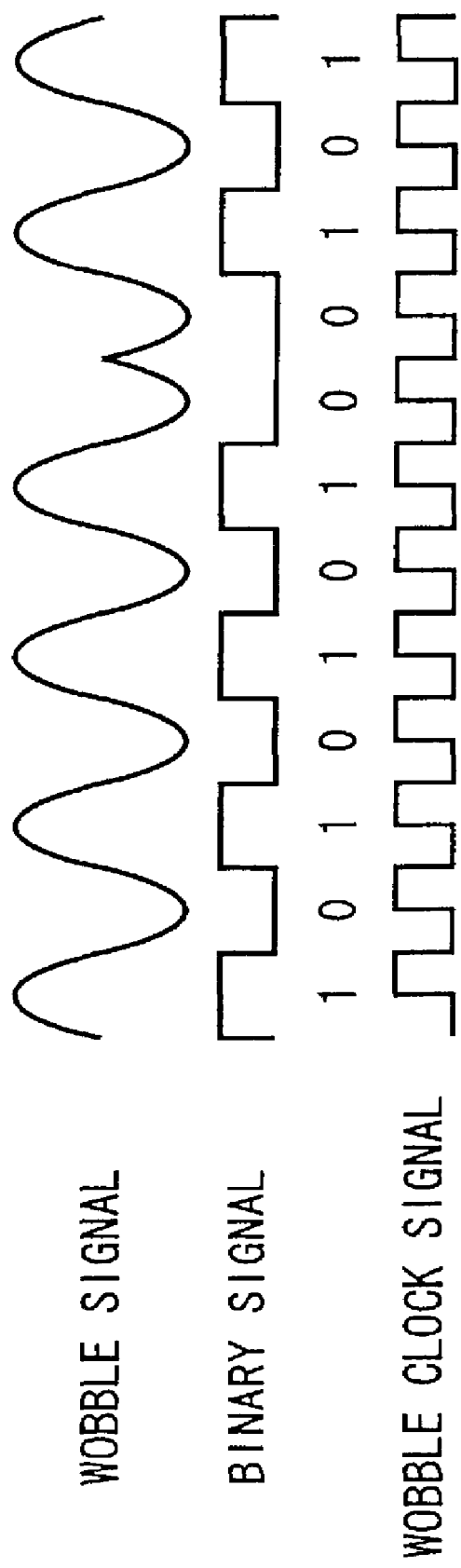
FIG. 9 is a diagram for explaining the operation performed in the first structural example of the header area detector 14.

A band-pass filter 31 extracts only the wobble frequency component of the pp signal inputted from the optical head circuit 8, and then outputs to a comparator 32 the wobble signal obtained as shown in the first row of FIG. 9. A high-pass filter may be used instead of the band-pass filter 21. The comparator 32 compares the wobble signal with a predetermined threshold value to thereby convert the wobble signal into a binary signal where 0 and 1 appear alternately as shown in the second row of FIG. 9, and outputs the binary signal to a Pattern detection section 34.

A frequency divider 33 demultiplies the channel clock signal inputted from the wobbling circuit 12 to thereby obtain a wobble clock signal as shown in the third row of FIG. 9, and then outputs the wobble clock signal to the pattern detection section 34. The pattern detection section 34 monitors the binary signal from the comparator 32 synchronously with the wobble clock signal from the frequency divider 33 and, upon detection of phase inversion of the wobble periodic waveform, outputs to the address encoder 15 information which signifies the existence of the header area after two periods of the wobble.

Figure 10:
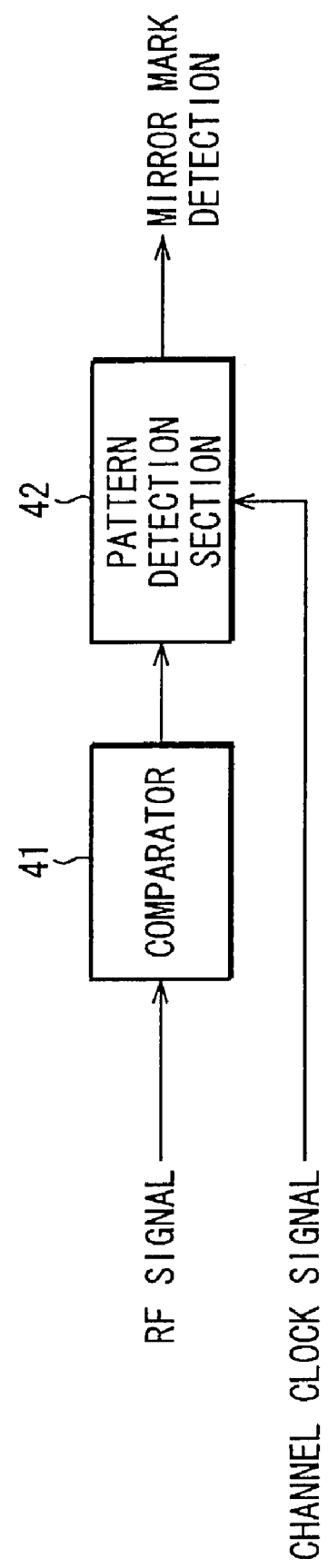
FIG. 10 is a block diagram showing a second structural example of the header area detector 14.

FIG. 10 shows a second structural example of the header area detection circuit 14. The second structural example is capable of detecting the header area on the basis that any embossed pit or mark is recorded in the unformatted header area, i.e., the unformatted header area is a mirror mark.

Figure 11:
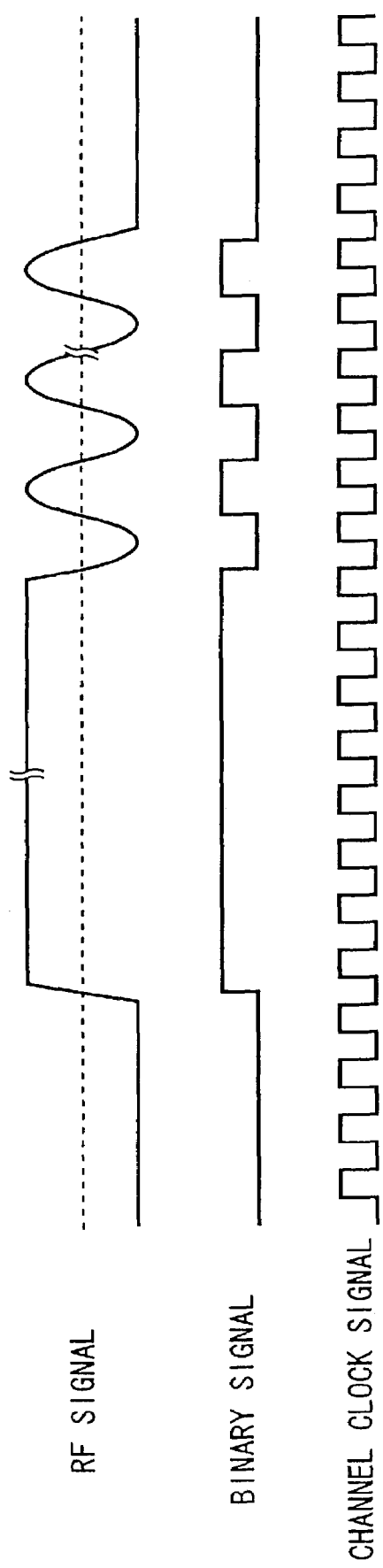
FIG. 11 is a diagram for explaining the operation performed in the second structural example of the header area detector 14.

A comparator 41 compares the RF signal, which is obtained from the optical head circuit 8 and is shown in the first row of FIG. 11, with a predetermined threshold value to thereby convert the RF signal into a binary signal shown in the second row of FIG. 11, and then outputs the binary signal to a pattern detection section 42. The pattern detection section 42 monitors the binary signal from the comparator 41 synchronously with a channel clock signal inputted from the wobbling circuit 12 and shown in the third row of FIG. 11. And if the binary signal is kept in such a state as to indicate its one value successively for more than a predetermined time, the pattern detection section 42 regards it as detection of a mirror mark and then outputs to the address encoder 15 information which signifies the existence of the header area.

Figure 12:
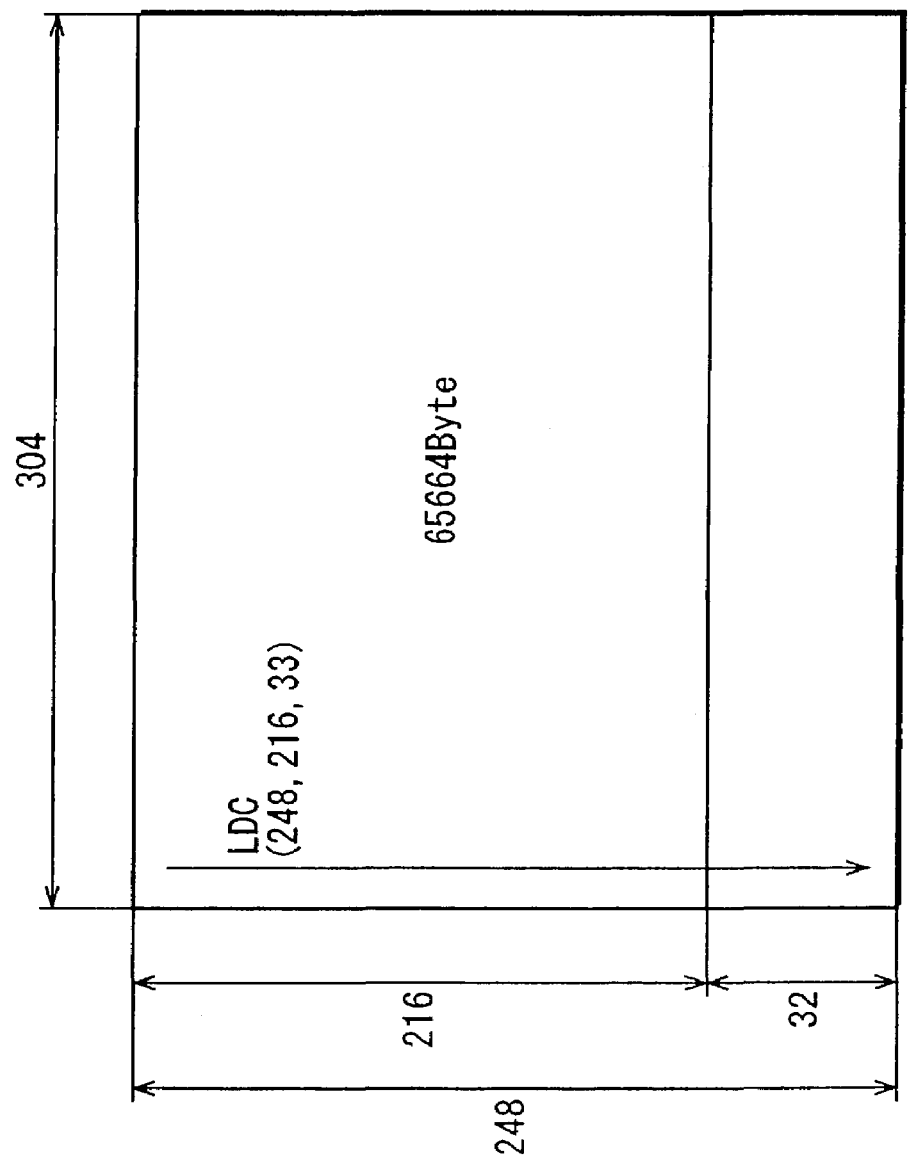
FIG. 12 is a diagram showing the structure of an error correction block.

FIG. 12 shows the structure of an error correction block. An error correction block is composed per data of 64 kilobytes (KB), and can be handled as a 2K data sector for recording and reproduction. In this case, recording and/or reproduction is performed in each error correction block of 64 KB, and a desired 2K data sector included therein is recorded and/or reproduced. An error correction code is composed of 216-symbol data and 32-symbol parity. The error correction block is composed of 304 error correction codes.

Figure 13:
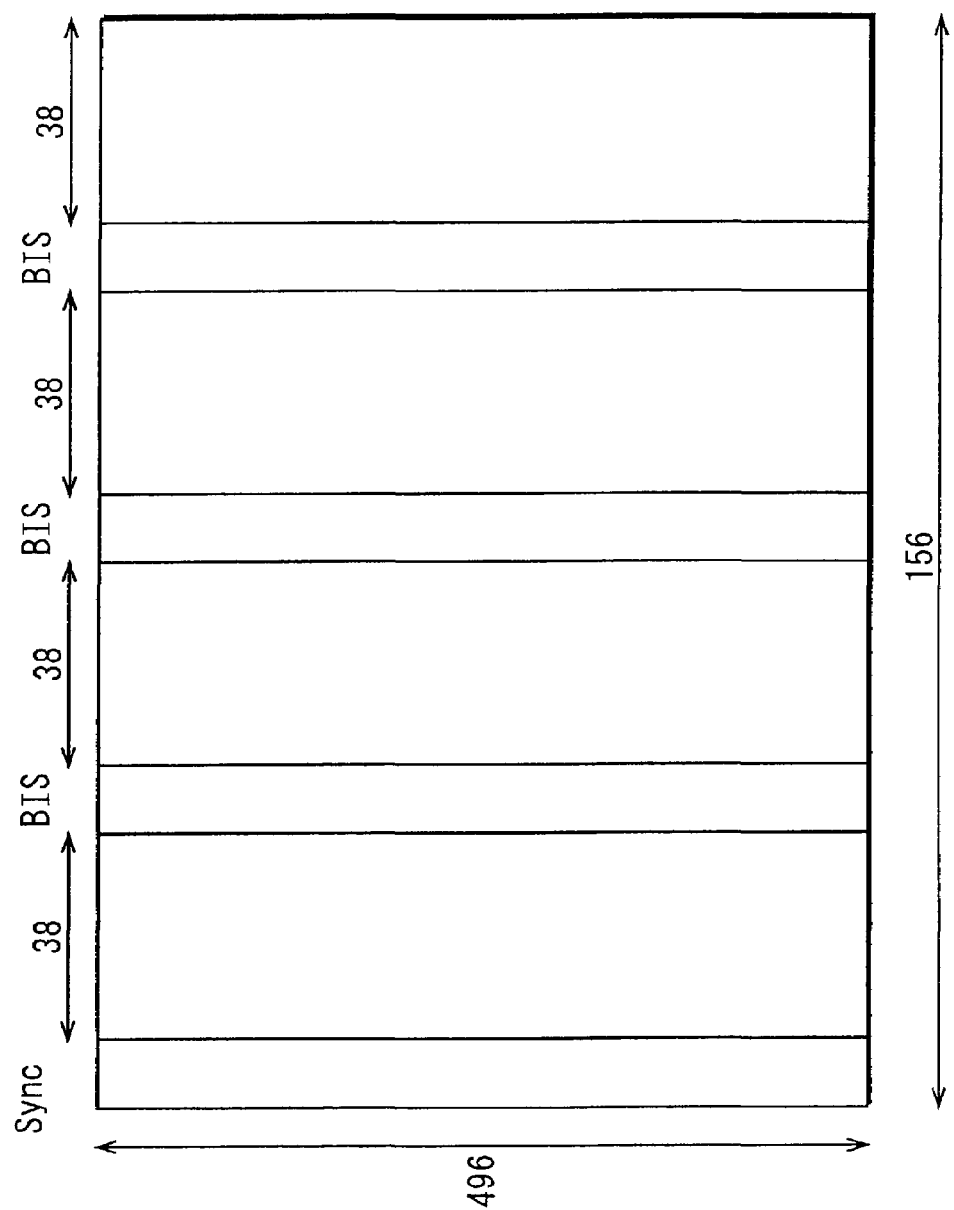
FIG. 13 is a diagram showing an ECC block cluster.

FIG. 13 shows an ECC block cluster. In this diagram, recording and reproduction are performed horizontally. When any data symbol continuous with a synchronizing signal (sync) is error, the data symbol between the sync and the BIS (burst indicator subcode) is regarded as a burst error, and a pointer is attached thereto. The data symbol with the attached pointer is corrected through pointer erasure by main correction code LCD (long distance code) (248, 216, 33) shown in FIG. 12.

Figure 14:
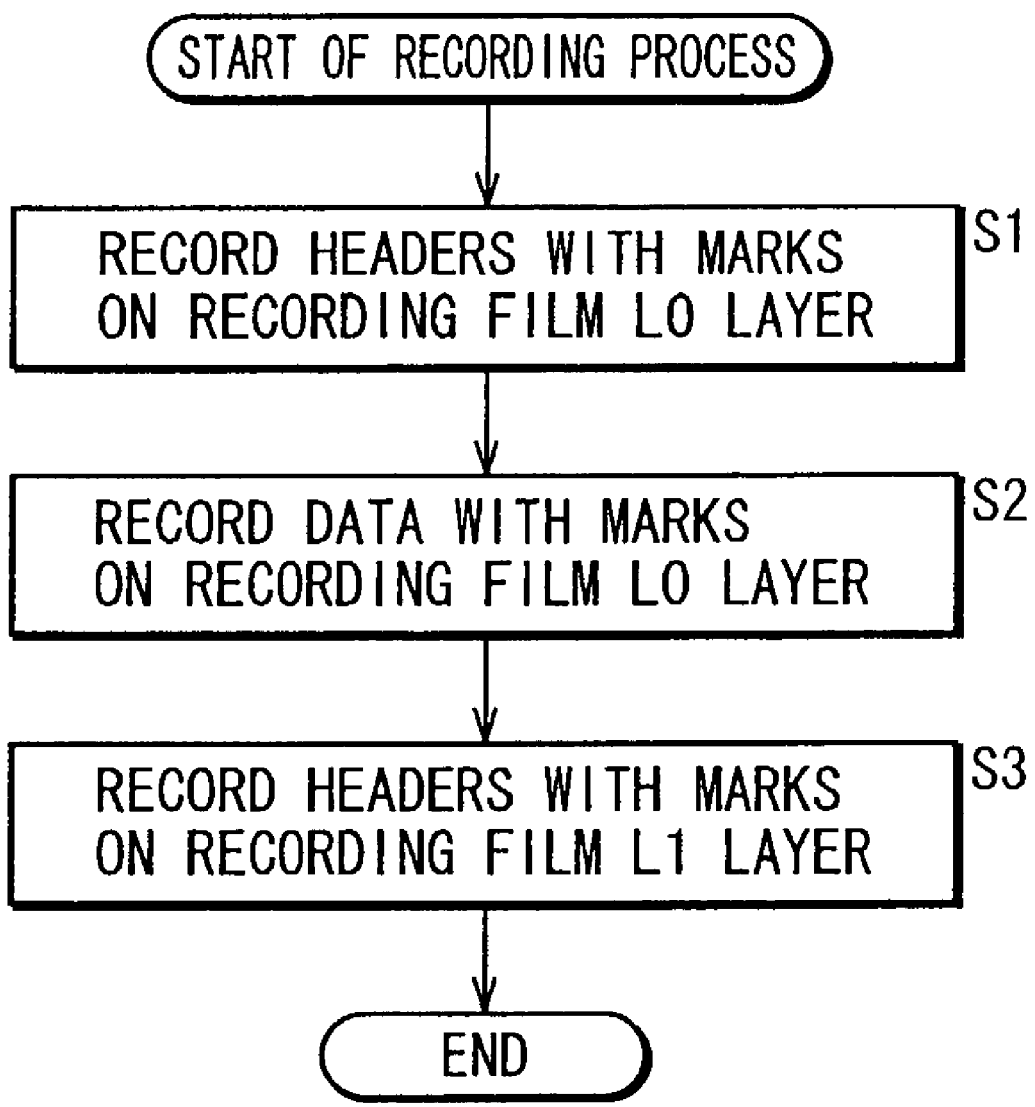
FIG. 14 is a flowchart for explaining a recording routine executed by the optical disk drive.

Next, referring to a flowchart of FIG. 14, an explanation will be given on a data recording operation performed on the optical disk 1 not formatted by the optical disk drive where the present invention is applied.

Figure 15A:
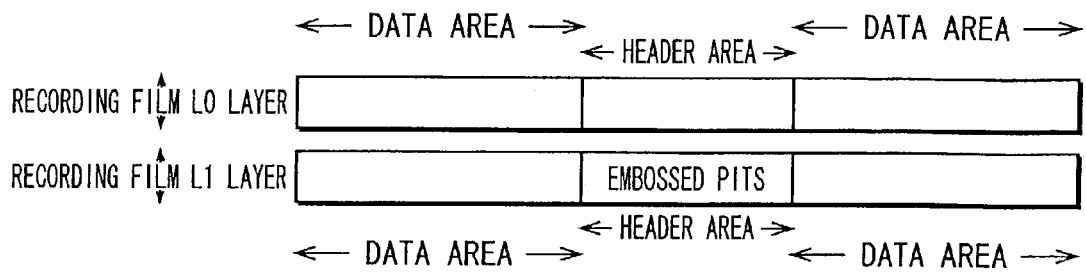
FIG. 15A is a diagram showing an unformatted optical disk 1.

In the optical disk 1 not formatted by the invention-applied optical disk drive, as shown in FIG. 15A, a land header and a groove header are recorded by embossed pits in the header area of the recording film L1 layer in the process of manufacture. That is, the recording film L0 layer of the optical disk 1 is not formatted yet, while the recording film layer L1 thereof is already formatted.

At step S1, the optical disk drive detects the header area in the recording film L0 layer of the optical disk 1 and, as shown in FIG. 16, records a groove header by a mark in the groove of the detected header area, and further records a land header by a mark in the land of the detected header area.

More specifically, the header area detection circuit 14 detects the header area of the recording film L0 layer in response to the pp signal inputted from the optical head circuit 8 and also to the channel clock signal inputted from the wobbling circuit 12, and then outputs the information to the address encoder 15. Subsequently the address encoder 15 generates and encodes an address, and then outputs a header signal obtained to the recording-reproduction circuit 9. Further the recording-reproduction circuit 9 supplies the header signal to the optical head circuit 8, which controls the laser output of the optical pickup 7 correspondingly to the header signal. And under control of the optical head circuit 8, the optical pickup 7 irradiates a laser beam to thereby record a groove header in the groove of the header area of the recording film L0 layer, and also to record a land header in the land.

Figure 15B:
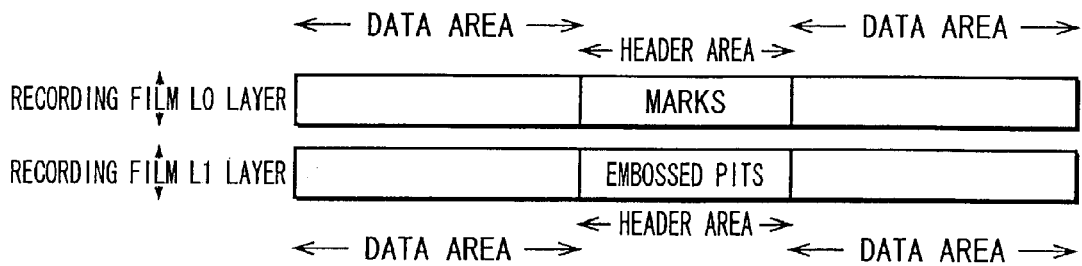
FIG. 15B is a diagram showing an optical disk 1 where a header is recorded in its recording film L0 layer.

Due to the process at step S1, a header is recorded by a mark in the header area of the recording film L0 layer as shown in FIG. 15B, so that this layer is formatted. And thereafter at step S2, the optical disk drive starts forming marks, which correspond to the data to be recorded, in the recording film L0 layer of the optical disk 1 earlier than in another recording film L1 layer.

More specifically, the error correction circuit 11 attaches an error correction code to the data inputted from the AV apparatus or the like via the AV interface 3. Then the modulation-demodulation circuit 10 modulates the data into binary signal and, after recording compensation executed in the recording-reproduction circuit 9, the optical pickup 7 irradiates a laser beam under control of the optical head circuit 8, thereby forming marks, which correspond to the data to be recorded, in the recording film L0 layer.

Figure 15C:
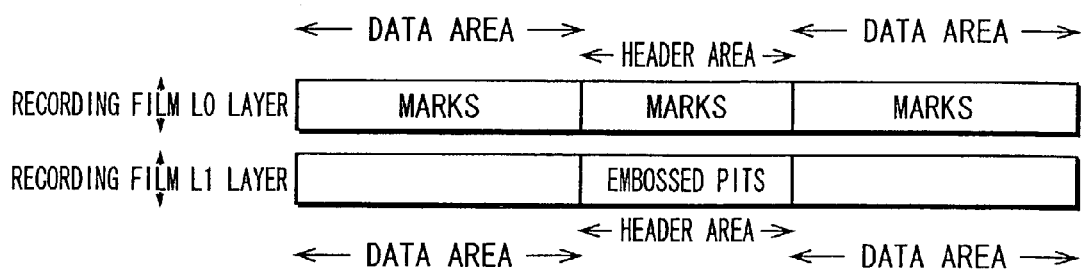
FIG. 15C is a diagram showing an optical disk 1 where data are recorded in the entire recording film L0 layer.
Figure 15D:
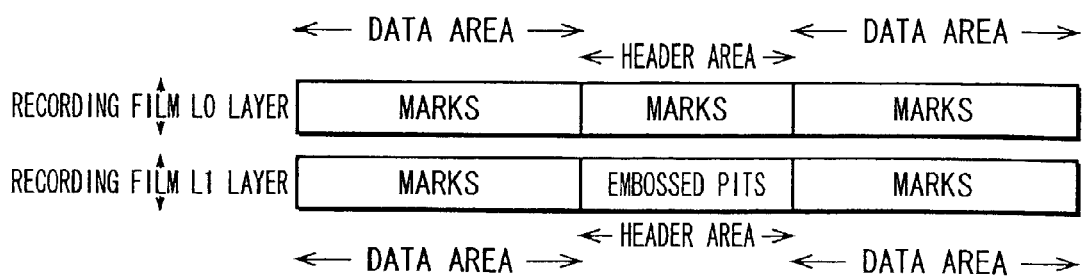
FIG. 15D is a diagram showing an optical disk 1 where data are recorded in its recording film L1 layer also.

Subsequently, after the recording film L0 layer has been completely used (i.e., after marks have been recorded in the entire data area of the recording film L0 layer) as shown in FIG. 15C, the optical disk drive forms marks, which correspond to the data to be recorded, in the recording film L1 layer as shown in FIG. 15D.

Figure 17:
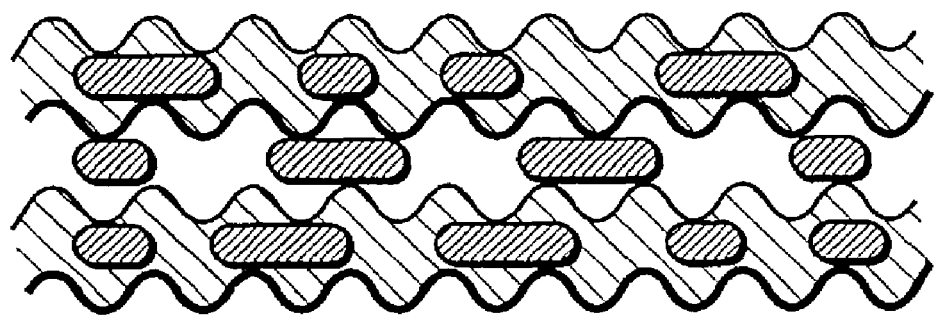
FIG. 17 is a diagram for explaining how lands and grooves are recorded.
Figure 18:
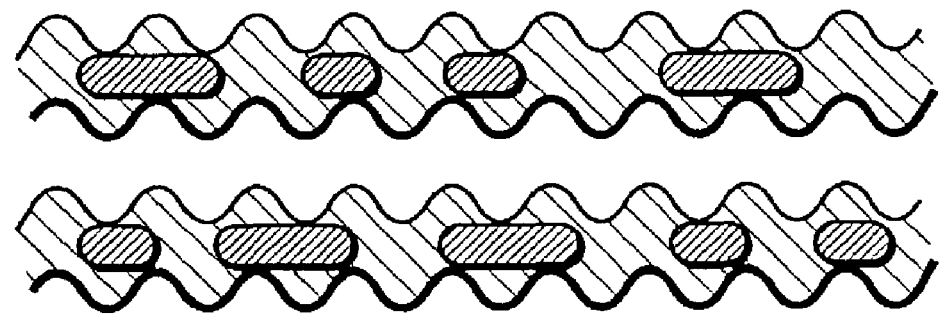
FIG. 18 is a diagram for explaining how grooves are recorded.

There are two methods of forming marks in the data area. One is to form marks in both lands and grooves by the land-groove recording shown in FIG. 17, and another is to form marks in either lands or grooves by the groove recording shown in FIG. 18.

As described above, according to the optical disk drive where the present invention is applied, the marks have already been formed in the entire header area and data area of the recording film L0 layer at the start time of forming marks in the recording film L1 layer, and none of embossed pit is existent at this time in the recording film L0 layer, so that the transmittance of the recording film L0 layer is rendered even. Therefore, a change or offset of the beam amplitude derived from the presence or absence of any mark or embossed pit is not caused in the beam transmitted through the recording film L0 layer and incident upon the recording film L1 layer or in the reflected beam from the recording film L1 layer, and consequently it becomes possible to realize high-precision recording and reproduction of marks corresponding to the data which are to be recorded on the recording film L1 layer.

When the data are to be re-recorded on the optical disk 1 where the recording film L1 layer is once formatted, the processing routine subsequent to step S2 may be executed.

Continuously with the process at step S1 of formatting the recording film L0 layer, dummy marks may be recorded in the entire data areas of the recording film L0 layer.

Thus, according to the invention-applied optical disk drive, a channel clock signal is generated while the PLL is locked at the frequency based on the wobble formed on the optical disk 1, so that the whole optical disk drive can be operated with high precision.

Further according to the invention-applied optical disk drive, a high-precision synchronizing signal can be obtained on the basis of the wobble. Consequently, even in case the embossed pits or marks fail to be properly read due to the harmful influence of some dust or the like on the surface of the cover layer formed to be thin as 0.1 mm or so, it is still possible to easily execute the necessary error correction.

When the optical disk drive is used as an apparatus for recording only headers by marks in the header areas of the recording film L0 layer of the optical disk so as to sell the optical disk 1 in a formatted state, then it is possible to remove the AV interface 3, the modulation-demodulation circuit 10 and the error correction circuit 11 from the structural example of FIG. 6.

The processing routine mentioned above can be executed by software as well as by hardware. In executing the processing routine by means of software, the routine can be executed by a computer where the program constituting such software is incorporated in its exclusive hardware, or can be installed from a recording medium into, e.g., a general-purpose personal computer which is capable of executing various functions in accordance with various programs installed therein.

This recording medium connotes a package one distributed for providing programs to users, and it comprises, as shown in FIG. 6, a magnetic disk (including floppy disk), an optical disk (including CD-ROM (compact disc-read only memory) and a DVD (digital versatile disk)), a magneto-optical disk (including MD (Mini Disc)), or a semiconductor memory where programs are recorded. The recording medium may further comprise a ROM, a hard disk and so forth where programs are recorded and provided for users in a state incorporated previously in the computer.

In this specification, the steps that describe the program stored in the recording medium are executed in time series in accordance with the mentioned sequence, or may be executed in parallel or individually without being restricted to the time series processing.

INDUSTRIAL APPLICABILITY

Thus, according to the present invention, marks can be precisely recorded on and/or reproduced from the recording film L0 layer and the recording film L1 layer of the dual-layer recording-reproduction optical disk.

The invention claimed is:

1. A recording-reproduction apparatus for recording data on and/or reproducing the same from a multi-layer optical disk having a first recording layer overlaying a second recording layer, said apparatus comprising:
   a recording means for recording a mark in the first or second recording layer by irradiating a laser beam to said optical disk the recording means being positioned in a closer proximity to the first recording layer than the second recording layer; and
   a format means for formatting the first recording layer by controlling said recording means,
   wherein at least one portion of the second recording layer is formatted before formatting of the first recording layer is completed by the format means, and the formatted first layer does not include any embossed pits.

2. The recording-reproduction apparatus according to claim 1, wherein the second recording layer of said optical disk has already been formatted by embossed pits.

3. The recording-reproduction apparatus according to claim 1, further comprising:

a wobble signal generation means for generating, in response to a reflected beam signal from the optical disk, a wobble signal corresponding to a wobble formed in a track of the disk; and an adjust means for adjusting a synchronizing signal on the basis of the wobble signal.

4. The recording-reproduction apparatus in accordance with claim 1, further comprising:

a beam receiving means for receiving the laser beam irradiated to and reflected from, said optical disk.

5. The recording-reproduction apparatus in accordance with claim 1, further comprising:

a beam receiving unit configured to receive the laser beam irradiated to and reflected from, said optical disk.

6. The recording-reproduction apparatus of claim 4, further comprising:

a data signal generation means for generating a data signal in accordance with the reflected beam received by said beam receiving means.

7. The recording-reproduction apparatus of claim 4, further comprising:

a control signal generation means for generating a control signal in accordance with the reflected beam received by said beam receiving means.

8. The recording-reproduction apparatus in accordance with claim 4, further comprising:

a detection means for detecting a header area in said first recording layer in accordance with the reflected beam received by said beam receiving means.

9. The recording-reproduction apparatus according to claim 8, wherein said detection means detects a mirror mark, which corresponds to the header area, in accordance with the data signal.

10. The recording-reproduction apparatus in accordance with claim 8, wherein the format means records the mark corresponding to a header in the header area detected by said detection means.

11. The recording-reproduction apparatus in accordance with claim 10, wherein wobbles are formed in tracks of the first and second recording layers of said optical disk, and the phase of the wobble is reversed immediately before the header are and said detection means detects the header area in accordance with inversion of the phase of said wobble signal.

12. The recording-reproduction apparatus of claim 4, further comprising:

a data signal generation unit configured to generate a data signal in accordance with the reflected beam received by said beam receiving unit.

13. The recording-reproduction apparatus of claim 4, further comprising:

a control signal generation unit configured to generate a control signal in accordance with the reflected beam received by said beam receiving unit.

14. The recording-reproduction apparatus in accordance with claim 4, further comprising:

a detection unit configured to detect a header area in said first recording layer in accordance with the reflected beam received by said beam receiving unit.

15. The recording-reproduction apparatus in accordance with claim 14, wherein the format unit records the mark corresponding to a header in the header area detected by said detection unit.

16. The recording-reproduction apparatus in accordance with claim 15, wherein wobbles are formed in tracks of the first and second recording layers of said optical disk, and the phase of the wobble is reversed immediately before the header are and said detection means detects the header area in accordance with inversion of the phase of said wobble signal.

17. A recording-reproduction method carried out in a recording-reproduction apparatus for recording data on and/or reproducing the same from a multi-layer optical disk having a first recording layer overlaying a second recording layer, said method comprising:

recording a mark in the first or second recording layer by irradiating a laser beam to said optical disk; and formatting the first recording layer by controlling the process at said recording, wherein at least one portion of the second recording layer is formatted before formatting of the first recording layer is completed, and the formatted first layer does not include any embossed pits.

18. A recording medium containing a program which is readable by a computer for recording data on and/or reproducing the same from a multi-layer optical disk having a first recording layer overlaying a second recording layer, said program comprising:

recording a mark in the first or second recording layer by irradiating a laser beam to said optical disk; and formatting the first recording layer by controlling the process at said recording step, wherein at least one portion of the second recording layer is formatted before formatting of the first recording layer is completed, and the formatted first layer does not include any embossed pits.

19. A recording-reproduction apparatus for recording data on and/or reproducing the same from a multi-layer optical disk having a first recording layer overlaying a second recording layer, said apparatus comprising:

a recording unit configured to record a mark in the first or second recording layer by irradiating a laser beam to said optical disk the recording unit being positioned in a closer proximity to the first recording layer relative to the second recording layer; and a format unit configured to format the first recording layer by controlling said recording unit, wherein at least one portion of the second recording layer is formatted before formatting of the first recording layer is completed by the format unit, and the formatted first layer does not include any embossed pits.

* * * * *